United States Patent
Niddam (10) Patent No.: US 7,385,943 B2
(45) Date of Patent: Jun. 10, 2008

(54) METHOD OF ALLOCATING COMMUNICATION RESOURCES IN AN MF-TDMA TELECOMMUNICATION SYSTEM

(75) Inventor: David Niddam, Toulouse (FR)

(73) Assignee: Alcatel, Paris (FR)

( * ) Notice: Subject to any disclaimer, the term of this patent is extended or adjusted under 35 U.S.C. 154(b) by 935 days.

(21) Appl. No.: 10/142,052

(22) Filed: May 10, 2002

(65) Prior Publication Data

US 2002/0176398 A1 Nov. 28, 2002

(30) Foreign Application Priority Data

May 22, 2001 (FR) .................................. 01 06723

(51) Int. Cl.
*H04B 7/212* (2006.01)
(52) U.S. Cl. ...................... 370/321; 370/330; 370/348; 370/437
(58) Field of Classification Search ................ 370/229, 370/230, 230.1, 235, 316, 319, 321, 322, 370/323, 325, 326, 328, 330, 336, 343, 345, 370/347, 348, 470, 472, 474, 431, 436, 437, 370/442, 443; 455/12.1, 13.2, 31.1, 17, 427
See application file for complete search history.

(56) References Cited

U.S. PATENT DOCUMENTS

| | | | |
|---|---|---|---|
| 6,028,853 A * | 2/2000 | Haartsen | 370/338 |
| 6,031,827 A | 2/2000 | Rikkinen et al. | |
| 6,445,707 B1 * | 9/2002 | Iuoras et al. | 370/232 |
| 6,807,165 B2 * | 10/2004 | Belcea | 370/347 |
| 6,944,146 B1 * | 9/2005 | Barany et al. | 370/338 |
| 2001/0043613 A1 * | 11/2001 | Wibowo et al. | 370/468 |
| 2003/0185166 A1 * | 10/2003 | Belcea | 370/321 |

FOREIGN PATENT DOCUMENTS

| | | |
|---|---|---|
| EP | 1 045 606 A2 | 10/2000 |
| WO | WO 99/26422 | 5/1999 |

* cited by examiner

*Primary Examiner*—Doris H. To
*Assistant Examiner*—Ian N. Moore
(74) *Attorney, Agent, or Firm*—Sughrue Mion, PLLC

(57) ABSTRACT

A method of allocating communication resources to terminals in an MF-TDMA telecommunication system is provided, in which digital data is transmitted in selected time intervals on each of a plurality of carriers. The resources for each terminal are allocated to frames grouped into superframes. The pattern of resources (time intervals and carriers) allocated to the terminal for the transmission of real-time data in each frame of a given rank in a superframe remains the same throughout the various superframes of the call relating to the real time data. Accordingly, the transmission of real time data is virtually free of jitter.

14 Claims, 10 Drawing Sheets

FIG. 6
FREQUENCY ALLOCATION

METHOD OF ALLOCATING COMMUNICATION RESOURCES IN AN MF-TDMA TELECOMMUNICATION SYSTEM

CROSS-REFERENCE TO RELATED APPLICATIONS

This application is based on French Patent Application No. 01 06 723 filed May 22, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of allocating communication resources in an MF-TDMA telecommunication system, in particular, although not exclusively, a system using a transparent geosynchronous satellite.

2. Description of the Prior Art

It is known in the art that diverse types of communication resources, in particular frequencies, time slots and codes, can be used to transmit a multiplicity of digital calls simultaneously.

Multiple frequency time division multiple access (MF-TDMA) transmission, which uses a multiplicity of frequencies and time slots simultaneously, provides a high data bit rate. This is why it is used in the DVB-RCS standard, currently in preparation, which concerns the transmission via satellite of digital data (audio, video, Internet, etc.).

In the above type of telecommunication system, each carrier, which has a particular frequency, offers a given number of time slots per frame, the number of time slots per frame being equal to 1 or to a power of 2, for example (4, 8, 16, 32, 64, 128 time slots per frame).

Messages are transmitted in superframes containing a particular number of frames. A frame, which comprises a particular number of carriers and time slots, is transmitted during a particular time and a superframe extends over a number N of frame durations and includes a number $N_1$ of carriers.

During a frame, the same message may be transmitted on several different types of carrier, that is to say with time slots of different duration.

As a general rule, MF-TDMA calls can be "star" calls, i.e. calls made through the intermediary of a base station. In other words, a terminal communicates with another terminal via the base station. It is also possible to effect calls directly between terminals, without passing through the base station, and this type of call is called a "meshed" call. It is also possible to combine star calls and meshed calls.

It has been found that, for real-time data, star or meshed MF-TDMA transmission can cause errors. In the case of video signals the errors can be visible and in the case of audio signals the errors can be audible. It has been found that these errors are the result of temporal instability (jitter), leading to inaccuracy in the times separating the various packets of the same call.

SUMMARY OF THE INVENTION

To remedy this drawback, a first aspect of the invention provides for transmitting the real-time data of the same call in such a fashion that, from one superframe to another, a frame with a given number always has the same pattern of resources for said real-time call. In other words, if a time slot with a given number for a given carrier is allocated to the real-time call, that carrier and that time slot remain allocated to the same call for the frame concerned for all the superframes of the connection.

In this way, the relative temporal positions of the data always remain the same. It has been found that this minimizes instability.

In one embodiment of the invention, to minimize the computations for allocating resources, and thereby to simplify and accelerate the allocation of resources, the pattern for said real-time data is the same for all the frames of the same superframe.

Regardless of its mode of implementation, the immobilization of resources (i.e. the repetition of the patterns of resources) for the real-time data of each frame simplifies resource allocation.

Moreover, to optimize resource allocation, it is not indispensable for non-real-time (nRT) data to be fixed in the same manner as real-time data. This is because, for nRT data, for example electronic mail or Internet traffic, the instability problems are much less critical than for real-time data. In this case the resources are allocated to each superframe as a function of the availabilities left over from the fixed patterns.

Telecommunication system terminals must generally be mass produced at low cost.

To achieve this objective, a second aspect of the invention, which can be employed independently of its first aspect, provides a terminal for communicating in MF-TDMA mode which can transmit simultaneously on two frequencies and receive simultaneously on two frequencies. To this end, when a time slot of a particular carrier has been allocated, the time slots of the other carriers which coincide in whole or in part with or which are contained within that time slot or which overlap that time slot, are not used for the same terminal in the same send or receive mode.

In accordance with a third aspect of the invention, which can also be employed independently of its other aspects, the resources for each frame are allocated uniformly in time in order to optimize the transmission channel, such as a transponder in a telecommunication satellite.

In accordance with a further aspect of the invention, which is independent of the preceding aspects, but equally has the object of limiting the complexity of the terminals, the latter include means for limiting the number of types of carriers and the numbers of carriers that can be used at any time. A type of carrier corresponds to a modulation speed and a code.

Also to limit the complexity of the terminals, their send and receive frequency agility is limited, i.e. a limit value is imposed on the frequency hops, and the send value can be different from the receive value.

The send and receive resources for each terminal are allocated continuously, superframe by superframe, by a control unit that is generally in the base station.

The allocation of resources must therefore be effected over a time budget less than the duration of the superframe, i.e. in a few tens of milliseconds for a potentially large number of terminals, possibly several thousand or even more.

The allocation of resources therefore constitutes a difficult problem.

Another object of the invention is therefore to provide means for allocating resources in the above kind of telecommunication system that combine high speed with low cost. To this end, in accordance with a further independent aspect of the invention, to enable available resources to be found quickly, the latter are stored in the form of vectors or words comprising binary digits representing types of resources, a bit at 1, for example, indicating a usable resource and a bit with the opposite value, for example 0, indicating an unusable resource. Accordingly, for each type of carrier, a vector can be provided having a number of components equal to the number of corresponding time slots for a frame and for each time slot a vector can be provided for the corresponding frequencies. It is also possible to provide a vector in which the availabilities are indicated for each time slot for all the carriers of a particular type, i.e. containing the same number of time slots.

Another vector can be provided for each type of carrier that indicates the time slots that can be used for transmission. To indicate the availability of meshed receive resources it is also possible to provide a vector providing a list of the time slots available for meshed reception for a given terminal and a given type of carrier.

A counter for each type of frame for determining the number of frequencies that can be used in each time interval can also be useful for fast allocation of resources.

In one embodiment of the invention the search for an available resource in a vector or word is effected in the following fashion:

Each vector or word is divided into a plurality of secondary words and a primary word is formed from the secondary words a number of digits equal to the number of secondary words and each digit of the primary word contains a bit with a given value, for example 1, indicating an available resource when at least one bit of the corresponding secondary word has the same value. Accordingly, to find the 1 bits, a search is first effected in the primary word and then in the secondary word or words corresponding to available resources. For example, starting from a word (or vector) of 1 024 bits, and using a 32-bit processor, two processor cycles are sufficient to find the first 1 bit in a 32-bit word.

The invention thus concerns a method of allocating communication resources in terminals of an MF-TDMA telecommunication system in which digital data is transmitted in selected time slots on each of a plurality of carriers, the resources for each terminal being allocated in frames, grouped into superframes, in which method, for sending real-time data, the pattern of resources (time slots and carriers) allocated to a terminal remains the same in each frame with a given number of the various superframes of the call relating to the real-time data.

In one embodiment of the invention, the pattern of resources allocated to the real-time data call is the same for all the frames of each superframe.

In one embodiment of the invention, non-real-time data calls are allocated available resources that can vary from one superframe to another.

If a time slot is allocated to a terminal for one transmission type (sending or receiving), the simultaneous time slots of other carriers which are equal to the allocated time slot, overlap it, or are contained in it can be rendered unavailable for that terminal and for the same transmission type, so that a terminal cannot send or receive simultaneously on two different carriers in the same time slot.

The invention also relates to a method of allocating communication resources to terminals in a transparent MF-TDMA satellite telecommunication system, in which, to distribute the time slot resources uniformly in each frame, the time slot resources are allocated in each new superframe starting from the last time slot that was set during the preceding superframe.

The invention also relates to a method in which, to facilitate finding available resources to be allocated, a set of vectors or words is provided for each type of carrier, i.e. for carriers having the same time slot duration, each vector or word comprising a series of binary digits of which one value represents an available resource and the other value the unavailability of resources, said vectors comprising:

a first vector having a number of components equal to the number of time slots of the frame and the value of each component of which represents the availability of a frequency for the time slot concerned, a frequency vector for each time slot having a number of components equal to the number of frequencies, the value of each component representing the availability of that frequency, and a time slot vector for each frequency having a number of components equal to the number of time slots, the value of each component representing the availability of that time slot at that frequency.

In this embodiment of the invention, to allocate a resource, the first vector can be searched first and then, if at least one component indicates the availability of a frequency, the available frequency the frequency vector is searched for the corresponding time slot.

To allocate a resource to a terminal for which a carrier frequency of the type concerned is available, the time slot vector that corresponds to that available frequency can be searched to determine an available time slot.

In one embodiment of the invention, there are provided, for each type of carrier, a vector comprising as many components as there are time slots, each component representing the availability of that time slot for sending, and a vector also comprising as many components as there are time slots, each component representing the availability of that time slot for receiving.

In one embodiment of the invention, to enable a fast search, each vector or word is divided into a set of secondary words and a primary word is formed having a number of binary digits equal to the number of secondary words, the value of each binary digit of the primary word representing the presence, in the corresponding secondary word, of at least one digit representative of the availability of a resource, the search being effected first in the primary word and then in a secondary word corresponding to an available resource.

All the secondary words can include the same number of binary digits and the primary word can include a number of binary digits equal to the number of binary digits of each secondary word.

Other features and advantages of the invention will become apparent from the following description of embodiments of the invention, which is given with reference to the accompanying drawings.

DETAILED DESCRIPTION OF THE PREFERRED EMBODIMENTS

Figure 1:
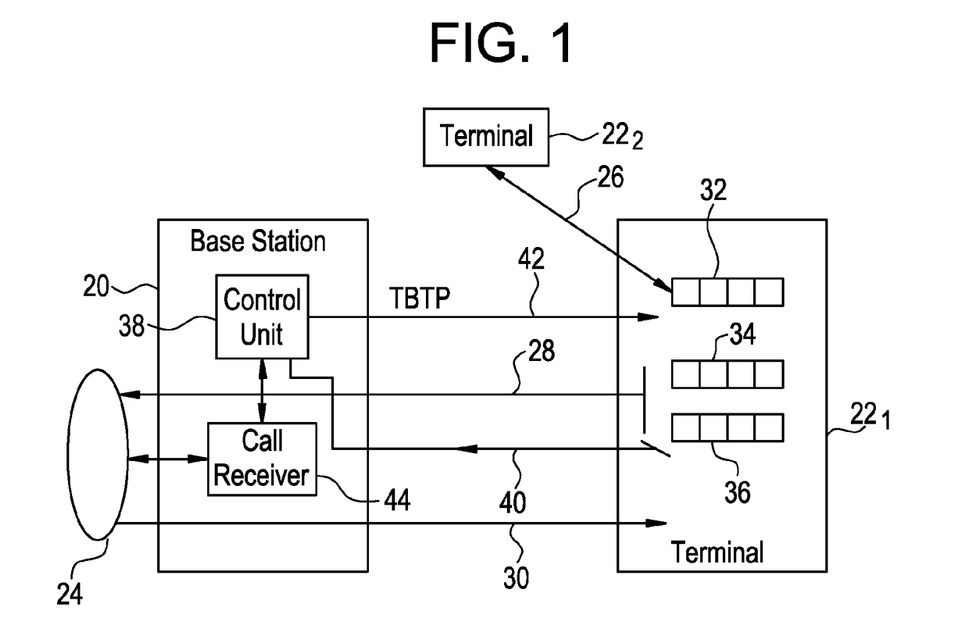
FIG. 1 is a diagram of a telecommunication system conforming to the invention.

FIG. 1 shows one example of a telecommunication system conforming to the invention. In this embodiment of the invention, all calls are effected through a satellite (not shown), for example a geostationary satellite that is transparent (i.e. constitutes a simple relay station), the territory covered by the satellite is divided into zones and each zone is assigned a base station 20. In each zone there is a plurality of terminals, the number of which can be very high, for example of the order of one hundred thousand.

FIG. 1 shows diagrammatically a terminal $22_1$ and a terminal $22_2$. The terminals can communicate with each other directly, without passing via the station 20, or via the station 20. Also, for communication with other zones, calls necessarily pass through the station 20, whence they are transmitted to a node 24 of the network.

In FIG. 1 the double-headed arrow 26 shows a direct call between the terminals $22_1$ and $22_2$. This kind of call is called a meshed call. A call via the node 24 connected to the station 20 is represented by the arrow 28 from the terminal $22_1$ to the node 24 and by the arrow 30 from the node 24 to the terminal. This kind of call via a node is called a star call.

Each terminal $22_1$, $22_2$ sends and receives data of various types, in particular real-time (RT) digital data stored in memories 32, 34 and non-real-time (nRT) data stored in memories.

The RT data comprises audio data, such as telephone calls, and video data, for example.

The nRT data comprises electronic mail or Internet traffic, for example.

The communication resources of each terminal are allocated continuously by a control unit 38 in the station 20. The control unit receives from each terminal a signal 40 estimating the capacity necessary for the requested call or connection. In return (arrow 42), the control unit 38 allocates the physical resources described later.

The station 20 also includes a unit 44 for accepting or refusing and for terminating a call. The unit 44 receives call requests from the terminals via the control unit 38 and when the unit 44 accepts a call it signals this to the control unit 38 to enable allocation of physical resources.

Calls are effected in MF-TDMA mode, in which digital data is transmitted on a multiplicity of carrier frequencies $f_1$, $f_2$, $f_3$, etc. (FIG. 2) which can be of diverse types. The type of an MF-TDMA carrier is defined by the number of time slots in a frame. For the carrier $f_1$, for example, four time slots 1, 2, 3 and 4 are provided, the carrier $f_2$ comprises eight time slots 5 to 12 (see FIG. 2), and for the carrier $f_3$ sixteen time slots 13 to 28 are provided. The number of time slots per frame of a carrier is $2^N$, where N is an integer. Accordingly, carriers $f_4$ with 32 time slots, carriers $f_5$ with 64 time slots, can be provided.

Figure 2:
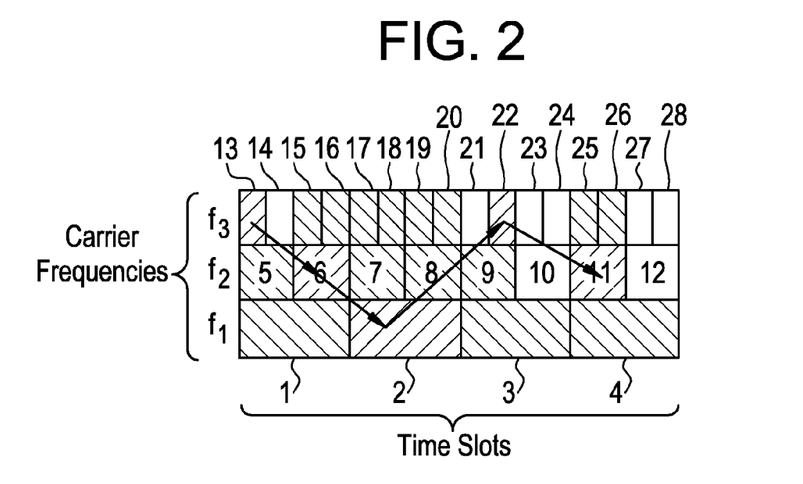
FIG. 2 is a diagram of a frame using a method in accordance with the invention of allocating resources.

All the time slots for all the carriers have the same usable bit rate and all the time slots for a given type of carrier have the same duration. This being so, time slot 1 of carrier $f_1$ is simultaneous with time slots 5 and 6 of carrier $f_2$. This time slot 1 of carrier $f_1$ is also simultaneous with time slots 13 to 16 of carrier $f_3$.

A call(connection) can be sent on several carriers during the same frame.

Figure 3:
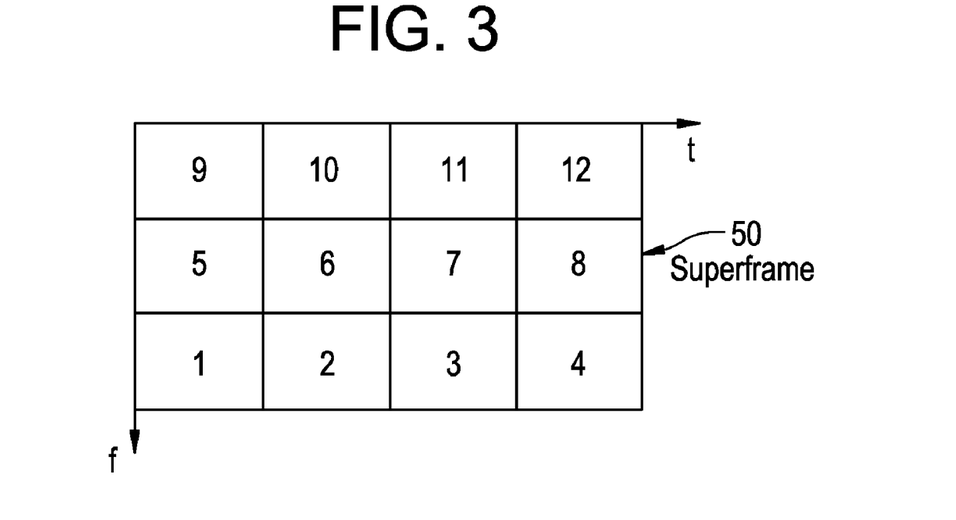
FIG. 3 shows a superframe comprising a plurality of frames.

A set of frames is sent together to form a superframe. In the example shown in FIG. 3, a superframe 50 comprises 12 frames numbered 1 to 12, frames 1 to 4 having the same carriers as each other but being sent successively. Frames 5 to 8 also include the same carriers as each other, which are different from those of frames 1 to 4, and they are sent successively, frames 1 and 5 being sent simultaneously, likewise frames 2 and 6, etc. Similarly, frames 9 to 12 all have the same carrier frequencies as each other, which are different from those of frames 1 to 4 and 5 to 8, and are sent in succession, frame 9 being sent simultaneously with frames 5 and 1.

Resources are allocated to the various terminals frame by frame or superframe by superframe. The allocation of resources can be modified from one frame to another.

In accordance with a first aspect of the invention, the real-time (RT) data of the same call for the same terminal $22_1$ is sent with the same pattern of resources from one frame to another. For example, as shown in FIG. 2, the real-time data of the terminal $22_1$ is sent in time slots 13, 6, 2, 22 and 11 of a frame. This pattern remains the same for each frame having a particular number in a superframe. For example, if the frame represented in FIG. 2 is frame No. 5 in superframe 50 (FIG. 3), the pattern of time slots 13, 6, 2, 22 and 11 for the RT data stream sent in this way will always be the same for this frame No. 5, from one superframe to another.

The fixed (immobile) character of the resource allocation pattern limits time variations (jitter) of the digital data sent in this way, which constitutes an important advantage for such data.

Also, the repetitive character of the pattern limits the computations to be effected in real time, which facilitates the implementation of the control unit 38.

In one embodiment of the invention, the patterns for the RT data are the same for all the frames 1 to 12 of a superframe 50, which further reduces the resource allocation computation times. In other words, in this embodiment time slots 13, 6, 2, 22 and 11 are allocated, in that order, in all frames 1 to 12 superframe 50.

To exploit fully the capacities of MF-TDMA transmission, the allocation of resources for nRT data, which has a lower priority than RT data, is evaluated again in each superframe 50. Each allocation of resources for nRT data is a function of capacity requests (40) from the terminals. Of course, the resources allocated to the nRT data are those left over from the RT data sending pattern.

In accordance with a second aspect of the invention, which can be applied independently of the first aspect, and which relates to RT data as much as nRT data, each terminal can, at any given time, send only on a single frequency in a given time slot. If other data must be sent other time slots are chosen. Similarly, when a terminal receives data in a particular time slot, that reception is effected at only one frequency, and the terminal cannot receive other data simultaneously at another frequency. This facilitates the implementation of the modems of the terminals.

This property means that when the terminal is sending (or receiving) on the carrier $f_2$ during time slot 6, it cannot send or receive simultaneously on the other carrier $f_1$ or $f_3$.

The unit 38 must therefore allow for these resource allocation constraints. Thus the unit 38 prohibits sending (or receiving) by the same terminal $22_1$ during time slots of other carriers that are entirely or partly simultaneous with the allocated time slot 6. As a result of this it is possible, for the same sending or receiving by the same terminal, to allocate slot 1 (with twice the duration of slot 6) and slots 15 and 16, each of which has a duration half that of slot 6. In a similar fashion, when time slot 2 is allocated, time slots 7, 8 and 17 to 20 cannot be allocated. When time slot 22 is allocated, slots 9 and 3 are unusable for the same sending or receiving function.

However, this prohibition of simultaneous allocation of resources is valid for only the same kind of transmission (sending or receiving). In other words if time slot 6 of carrier $f_2$ is used for sending, the same terminal can use time slot 1 of carrier $f_1$ for receiving.

Figure 4:
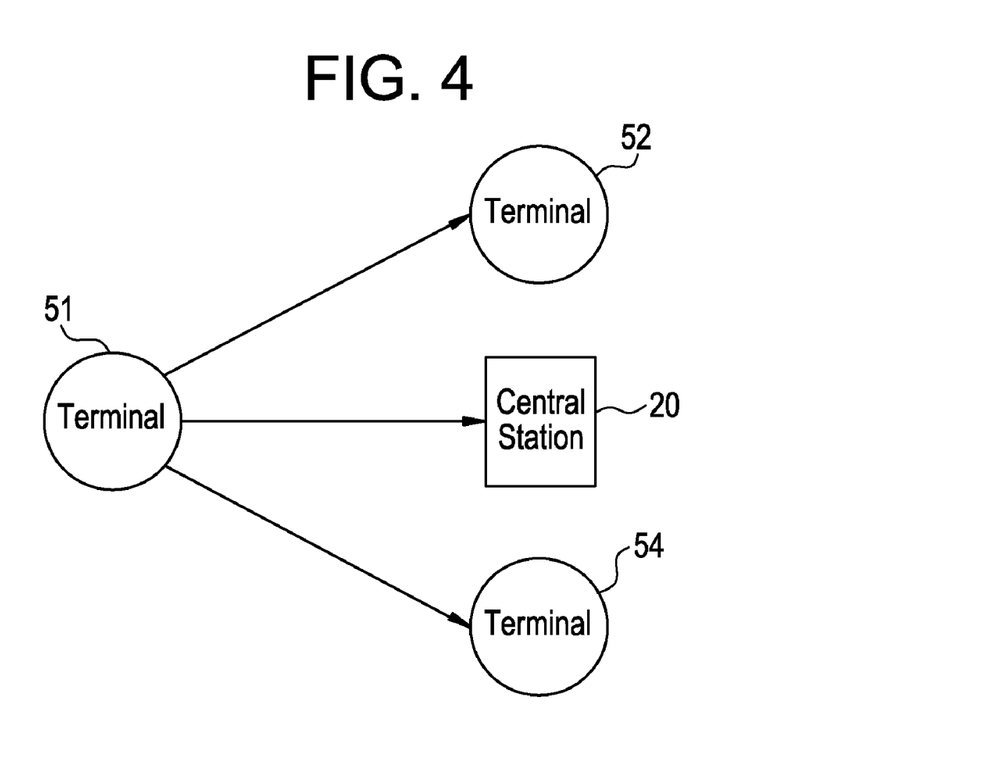
FIG. 4 is a diagram showing star and meshed calls.

In addition to the constraints associated with the limited capacity of each terminal, the allocation of resources must respect other constraints associated with optimizing calls, in particular the link balance. Accordingly, a short time slot can be assigned for a good link balance and a long time slot for a less favorable link balance. For example, when a terminal 51 must send, on the one hand, to two terminals 52 and 54 and, on the other hand, to the central station 20 (FIG. 4), for the connection of the terminal 51 to the terminal 52 time slot 6 is chosen, for example, and for the connection of the terminal 51 to the terminal 54, time slot 2 is chosen, whereas for the connection of terminal 51 to the station 20, time slot 22 is chosen. Note that for meshed connections, i.e. terminal-to-terminal connections, for which the link balance is not the most favorable, relatively long time slots 6 and 2 are chosen, whereas a relatively short time slot is chosen for the connection to the station 20 because the station 20 has a high-performance receive antenna.

Figure 5:
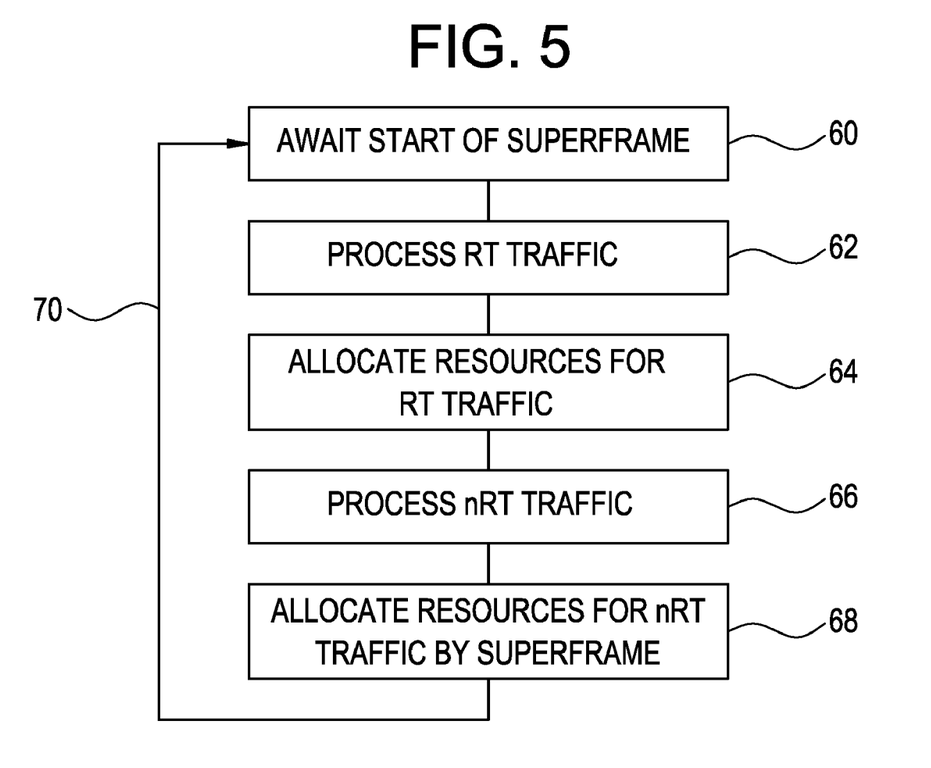
FIG. 5 is a flowchart showing some steps of a method conforming to the invention.

FIG. 5 is a diagram illustrating a resource allocation method of the type described above, in particular with reference to FIG. 2.

To allocate resources, the beginning of a superframe is awaited (step 60).

Then (step 62), the control unit 38 processes RT connection requests, i.e. connection requests or clearing down requests. These requests are processed by the call acceptance device 44 (FIG. 1).

As already indicated, the outcome of step 62 is that "fixed" resources are allocated for RT traffic. These resource allocations are sent to the terminals via channel 42 by means of a signal TBTP (step 64).

The nRT data is processed (step 66) after the allocation of resources to the RT data.

The final step (step 68) therefore consists in allocating the physical resources for nRT traffic, allowing for the constraints indicated above, the resources allocated to nRT data being valid for only one superframe, as shown by the connection 70 between step 68 and the initial step 60 of awaiting a superframe.

According to a further aspect of the invention, also intended to limit the complexity of the implementation of the terminals, the latter accept, for sending and receiving, only a limited number of carriers and a limited number of types of carrier. Of course, the number of types of carriers is at most equal to the number of carriers. In other words, if four carriers are provided, there are one, two, three or four carrier types. If the number of carrier types is equal to one, the four carriers concerned are all of the same type, i.e. all have the same time slot duration.

This limitation on the number of parameters that can be allocated to each terminal is a constraint managed by the control unit 38. Nevertheless, in one embodiment, to limit the constraints imposed on the central control unit 38, some management functions can be effected in the terminal itself. For example, if the terminal is using the maximum number of carriers allowed and needs to use a different carrier, and must therefore replace one of the carriers already in use, the choice of the carrier to discard is made within the terminal itself. For example, the carrier that is discarded to make room for a new carrier allocated by the unit 38 is that allocated least recently. A protocol for exchanges between the control unit 38 and the terminal enables the control unit 38 to discard the carrier allocated to the terminal least recently to allocate a new carrier to that terminal.

In accordance with a further aspect of the invention, which can also be used independently of its other aspects, a frequency distribution is chosen such that the terminals have limited sending and receiving frequency agility, whilst allowing all possible meshed or star connections between terminals.

Limited agility means that a terminal can hop from one frequency to another by only a limited value, which can be different for receiving and for sending. For example, the capacity for frequency hopping is 20 MHz for MF-TDMA receiving and 50 MHz for MF-TDMA sending.

Figure 6:
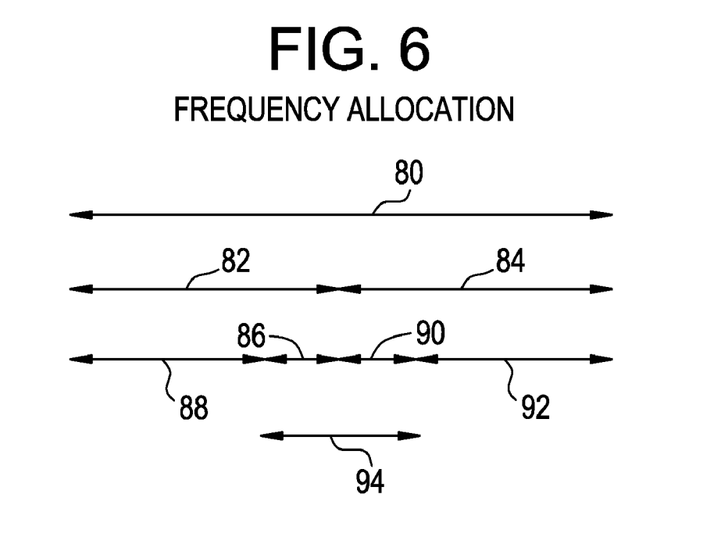
FIG. 6 is a frequency allocation diagram for the various types of calls.

In the example shown in FIG. 6, the frequency band allocated to the terminals is represented by the line 80 and the width of this band is 100 MHz.

The 100 MHz band of frequencies 80 is divided into two equal parts in this example, each part corresponding to one group of terminals.

For sending, a first group of terminals uses the half-band 82 and the second group of terminals uses the upper half-band 84, each of these half-bands having a width of 50 MHz.

In each of the two sending half-bands 82 and 84, there are two unequal parts. Accordingly, the half-band 82 includes a sub-band 86 with a width of 10 MHz which corresponds to the highest values of the half-band 82 and a sub-band 88 with a width of 40 MHz. Likewise, the half-band 84 includes two unequal sub-bands, namely a sub-band 90, also having a width of 10 MHz, and corresponding to the lowest values of the half-band 84, and a sub-band 92 having a width of 40 MHz.

The adjacent and contiguous sub-bands 86 and 90, which together form a band with a width of 20 MHz, are used for meshed (terminal-to-terminal) sending, while the sub-bands 88 and 92 are used for star sending (from the terminals to the central station).

Finally, the combination of the two contiguous central sub-bands 86 and 90 is allocated for meshed reception.

It can therefore be seen that the sending frequency agility constraints are complied with since, in each group of terminals, the sending frequency band extends over 50 MHz and the meshed reception band extends over 20 MHz.

For example, a terminal from the first group can send in meshed mode or in star mode and comply with the 50 MHz agility constraint because, in this first group, the half-band 82 has a width of 50 MHz. Similarly, for the second group, the half-band 84 has a width limited to 50 MHz.

For meshed calls, a terminal from the first group can send to any terminal from the first or second group because its meshed sending band, which is limited to 10 MHz (and which is the receiving band for the receiving terminal), is inside the meshed receive sub-band 94. In other words, for meshed calls, a sending frequency chosen in the band 86 is a frequency in the receiving band 94 of all the terminals.

Although it is preferable for the widths of the central sub-bands 86 and 90 to be equal, they can be unequal. In this case, the end sub-bands 88 and 92 can also have unequal widths.

Moreover, the numbers of terminals in the first and second groups can vary and be equal or different.

Various features of the method implemented in the concrete form of a program installed on the control unit 38, enabling use of standard processes, available off the shelf, whilst allowing fast allocation of resources to a large number of terminals, are described next with reference to FIGS. 7 to 11.

These results are obtained by providing, on the one hand, data "maps" (FIG. 7) and, on the other hand, fast means for searching for data in these maps (FIG. 11), the maps being specifically suited to fast searching (or reading) means.

Figure 7:
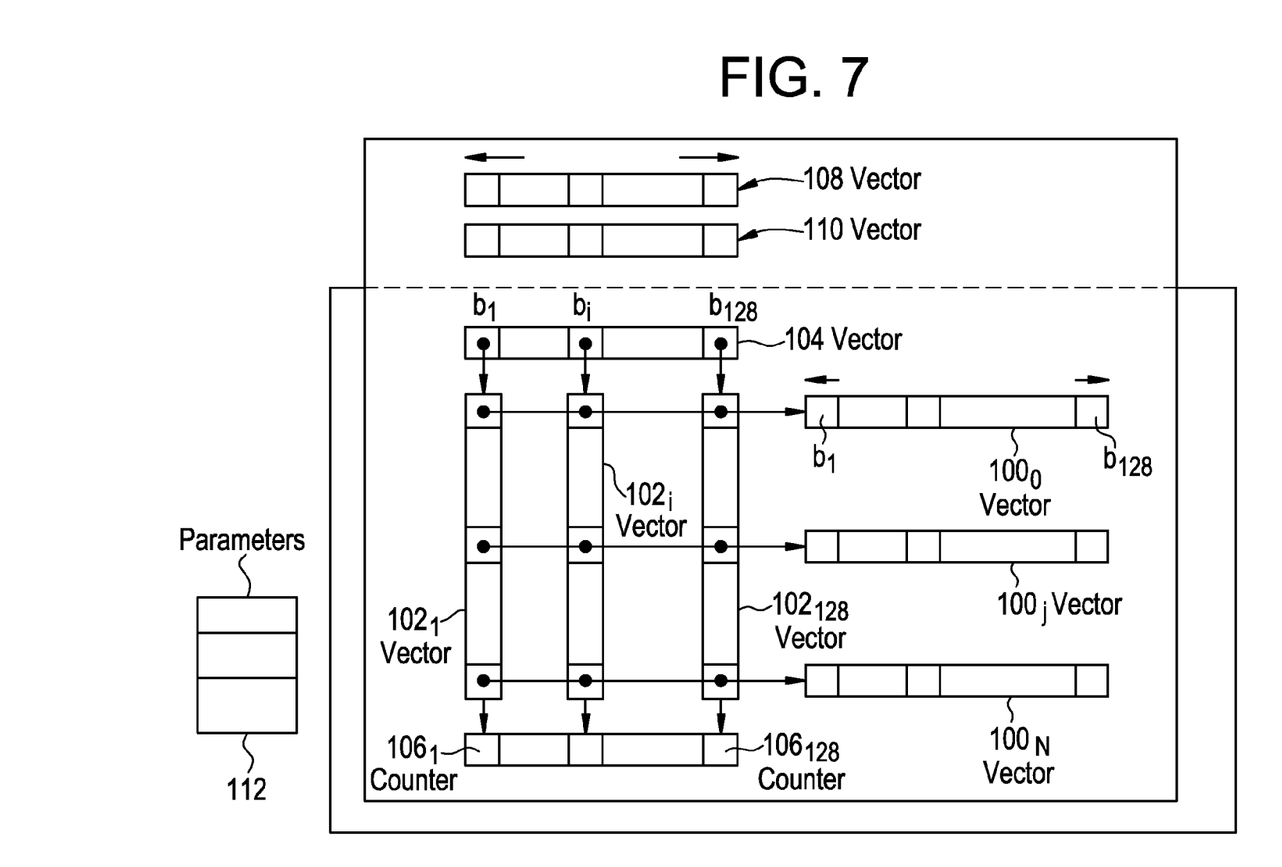
FIG. 7 is a diagram showing vectors conforming to the invention used for fast allocation of communication resources.

Refer first to FIG. 7, which shows the data stored in memory of the device 38 for one type of carrier per frame.

The carrier comprises 128 time slots, for example.

There is, for this type of carrier, and for each frequency $f_0$ to $f_N$, a data vector or word represented by a row $100_0 \ldots 100_N$ with 128 bits (the same number of bits as time slots) $b_1$ to $b_{128}$, a bit having the value 1 when the time slot concerned is available and having the value 0 when that time slot is unavailable.

There are also vectors or words represented by columns $102_1$ to $102_{128}$. Each column corresponds to a time slot and comprises N values, i.e. as many values as there are frequencies of the particular type (128 time slots per frame). Each column $102_i$ contains for each frequency from 0 to N a bit which has a value 1 when the corresponding frequency is usable and the value 0 when that frequency is unavailable.

There is also another vector or word 104 represented by a row that indicates whether there is at least one available frequency in the time slot for the given carrier type (128 time slots/frame in this example) and for each time slot of that carrier type. Thus the row 104 comprises 128 values. Each value, which is a bit $b_i$ (0 or 1), allows for the corresponding column $102_i$ in the following fashion: the bit $b_i$ has the value 1 if there is at least one available frequency in that time slot, i.e. if there is at least one bit with the value 1 in the column $102_i$. In other words, a bit having the value 1 in the row 104 means that there is at least one available frequency for that time slot.

The data in columns $102_1$ to $128_{128}$ is also used in counters $106_1$ to $106_{128}$ each of which contains a number which is the number of usable frequencies in the time slot i concerned for a given type of carrier, i.e. the number of bits with the value 1 in the corresponding column. Of course each counter is, on the one hand, incremented each time that a resource (a frequency) is freed in the corresponding column and, on the other hand, decremented each time that a resource is allocated to a terminal for the time slot concerned.

If the counter $106_i$ reaches 0, there is no longer any available frequency in the time slot of rank i. In this case the bit $b_i$ of row 104 is forced to 0.

There is also a word 108 in the form of a row analogous to the row 104, i.e. comprising as many values (bits) as there are time slots. A bit at 1 for a time slot indicates the availability of that time slot to the terminal concerned for star or meshed sending.

For each terminal, there are as many words 108 as there are carrier types.

Another word 110 in the form of row analogous to the row 108 contains a series of 128 bits (the same number of bits as time slots) representing the availability of the time slot for meshed reception when the bit has the value 1. Of course, the data in the row 110 is such that if a time slot is provided, for the terminal concerned, for reception from another terminal (meshed connection), it cannot be provided at the same time for reception from still another terminal. For each terminal, there are as many words 110 as carrier types.

Finally, the unit 38 takes account of the set of parameters 112 allocated to each terminal. These parameters are, on the one hand, the carrier type (the total number of time slots during a frame) and the carrier, i.e. the frequency.

To facilitate the computations, it is preferable to maximize the use of the parameters already allocated before changing parameter or allocating a supplementary parameter.

The mechanism for allocating a resource to a terminal is described next with reference to FIG. 8.

Note first of all that the input data is only the carrier type, i.e. the number of time slots per frame. This is the only data operative in ensuring that the quality of the link is suitable for the terminal: a short time slot can be allocated when the link balance is good and a long time slot has to be used for a mediocre link balance. From this input data, the control unit 38 either chooses a frequency and a time slot or indicates that it has not succeeded in allocating a resource, in which case the unit 38 attempts to allocate resources on another type of carrier.

Figure 8:
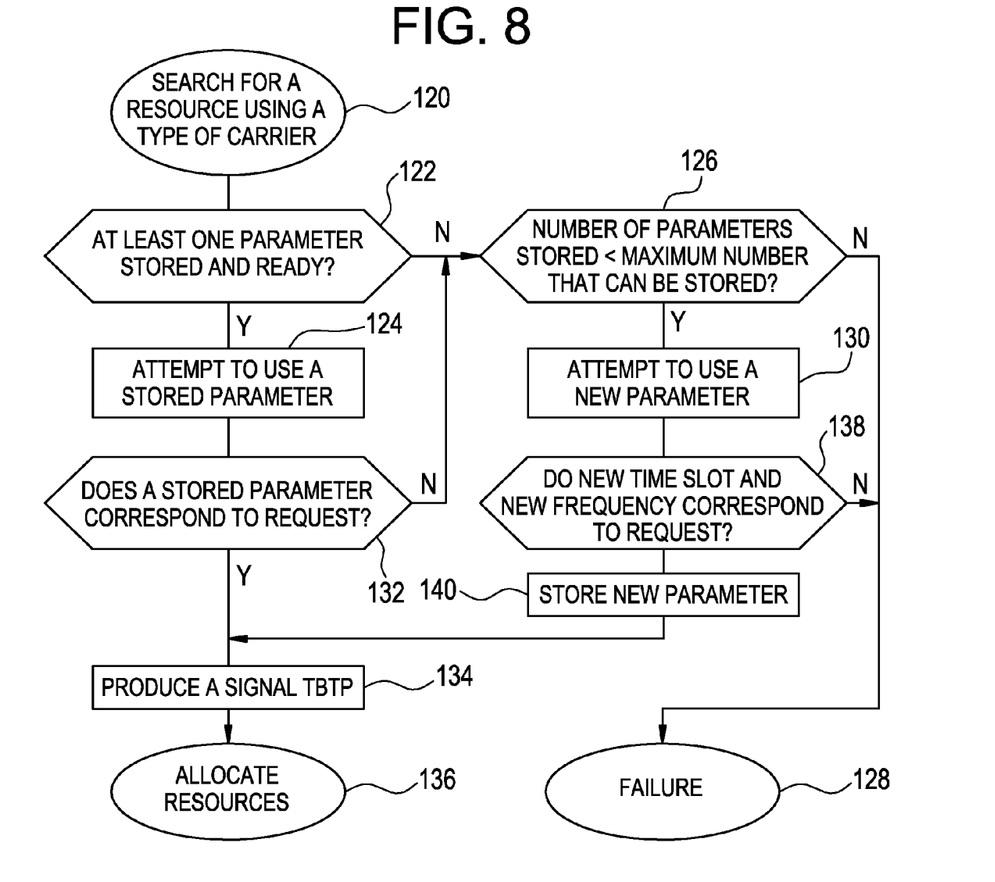
FIG. 8 is a flowchart of a resource allocation method according to the invention.

Thus the first block 120 of the FIG. 8 flowchart is: search for a resource using a carrier type.

The second step 122 determines if there is at least one parameter stored and ready (block 112, FIG. 7). In the event of a positive response to this query, the unit 38 attempts to use a stored parameter (step 124). To this end it searches for a parameter corresponding to the required carrier type (step 120) and an available time slot at a corresponding frequency for which the source terminal and the destination terminal have no time constraint (no incompatibility).

In the event of a negative response to the query corresponding to step 122 (is there at least one parameter stored and ready?), step 126 determines if the number of parameters stored is less than the maximum number of parameters that can be stored. If the maximum number is reached, then the search fails (step 128).

If the number of parameters stored does not reach the authorized maximum, an attempt is made to determine a new parameter (step 130), by searching for a new frequency or carrier corresponding to the type concerned, and for which a time slot is available and the source and destination terminals have no time constraint prohibiting that slot.

Following step 124, step 132 determines if a stored parameter corresponds to the request, in which case a resource allocation signal TBTP is produced (step 134) and sent to the terminal, which leads to successful resource allocation (step 136).

If the check carried out in step 132 yields a negative response, then the check of step 126 is carried out.

Following step 130, step 138 verifies if the new time slot and the new carrier frequency correspond to the request. In the event of a positive response, the new parameter, i.e. the frequency and the carrier type, is stored (step 140), after which the resource allocation signal is formed (step 134).

In the event of a negative response in step 138 the search fails (step 128).

Figure 9:
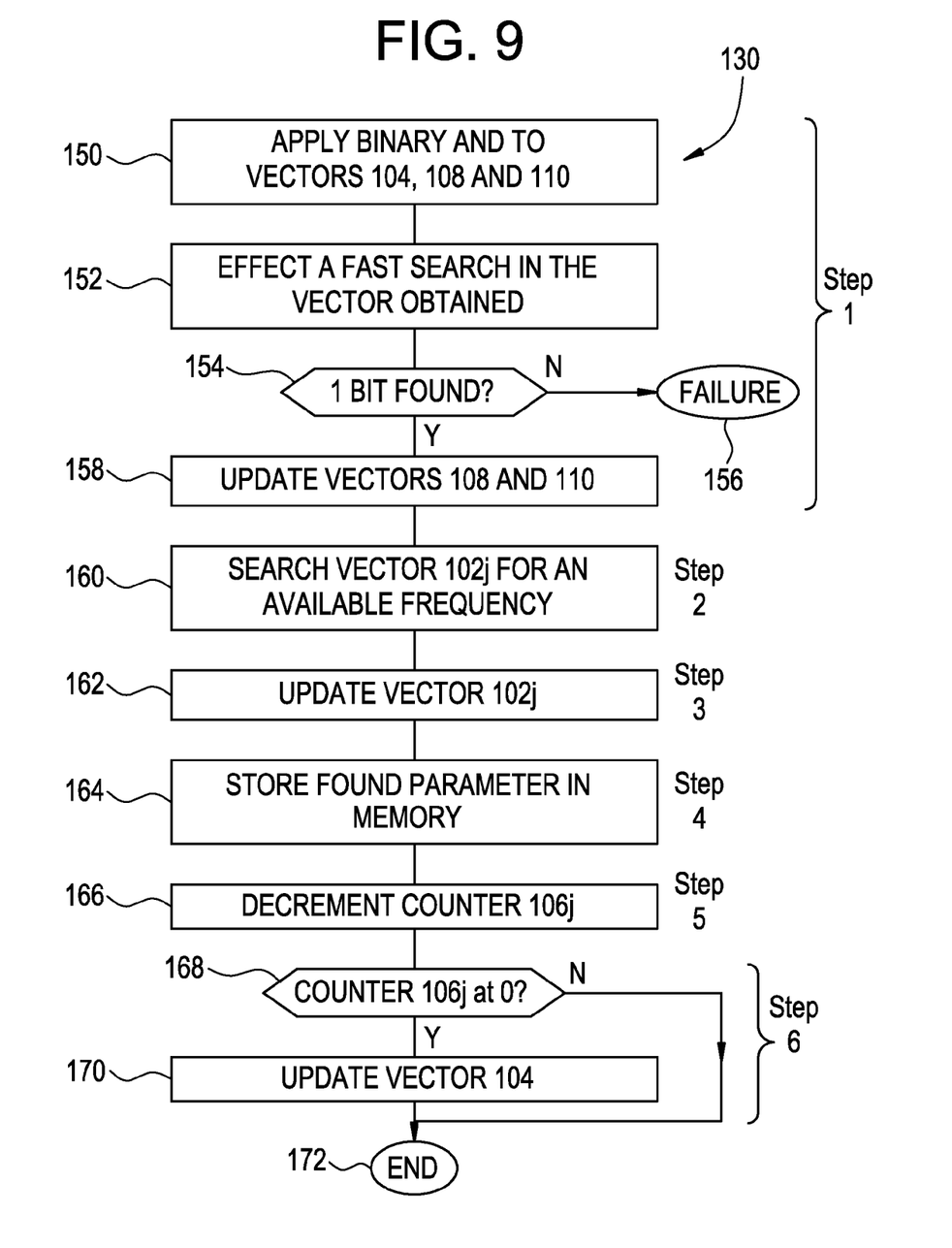
FIG. 9 shows in detail one step of the method shown in FIG. 8.

FIG. 9 is a detailed flowchart corresponding to step 130 of FIG. 8, i.e. the attempt to determine a new parameter.

To obtain a new parameter the binary AND operator is applied to the rows or vectors 104, 108 and 110 of FIG. 7 (step 150). Each vector comprises a number of values equal to the number of time slots of the type of carrier concerned, and a 1 in the vector 104 means that there is at least one available frequency for the time slot concerned. A 1 in the vector 108 means that a frequency is available for sending for the time slot concerned and for the terminal concerned. A 1 in the vector 110 means that a frequency is available for receiving in the time slot concerned.

If the vector resulting from operation 150 includes a 1, this means that a time slot and a frequency are available. This determination is effected in the subsequent steps 152, 154.

To determine if the vector or word resulting from step 150 includes a 1, step 152 performs a fast search—described in more detail later—starting from a random position in the vector or word resulting from step 150. Note that starting the search from a random position has the advantage of giving no preference to a particular position of the vector obtained which, statistically, enables the use of all of the resources that may be available in the vectors obtained. This being so, the channel by which the resources are sent sends a distribution of resources that is relatively uniform in time. This applies in particular to the transponder on board the satellite.

Step 152 furnishes a result (154): either a bit has been found or a bit has not been found. This latter case represents failure (step 156).

If a bit has been found, this signifies that the resource that has been found is being used and the vectors 108 and 110 are therefore updated (step 158). This updating is effected for all the types of carriers used by the terminal concerned to enable management of incompatibilities between the simultaneous use of time slots as described with reference to FIG. 2. This figure shows that, if time slot 13 is allocated, time slots 5 and 1 are unusable. Similarly, if time slot 6 is allocated, time slots 1, 14, 15 are unusable; if time slot 2 allocated, time slots 7, 8, 17, 18, 19, 20 are unusable, and so on.

If a bit at 1 is found in position j in the resultant vector of the vectors 104, 108 and 110, this means that in the corresponding column $102_j$ (FIG. 7) there is a 1 corresponding to an available frequency. This vector $102_j$ is therefore searched (step 160) to determine an available frequency. This search starts from the last frequency previously found; however, that frequency is not used—the immediately next available frequency is used. If the frequency previously found (and therefore being used) were used, this would further reduce the number of time slots available for that frequency, with the risk of making that frequency completely unavailable, although it is preferable to maximize the use of the previously stored parameters assigned to a given terminal.

The use of a frequency as the result of step 160 makes it obligatory to update the vector $102_j$ (step 162): at the frequency found for this time slot j, the bit is set to 0.

The parameter found is then placed in memory (step 164).

After this step 164, the counter 106j (FIG. 7) is decremented (step 166).

If the counter 106j goes to 0 (step 168), the vector 104 is updated to the position j (step 170) and the operation terminates (step 172), whether it passes through step 170 or not (i.e. whether the counter 106j is at 0 or not).

Figure 9A:
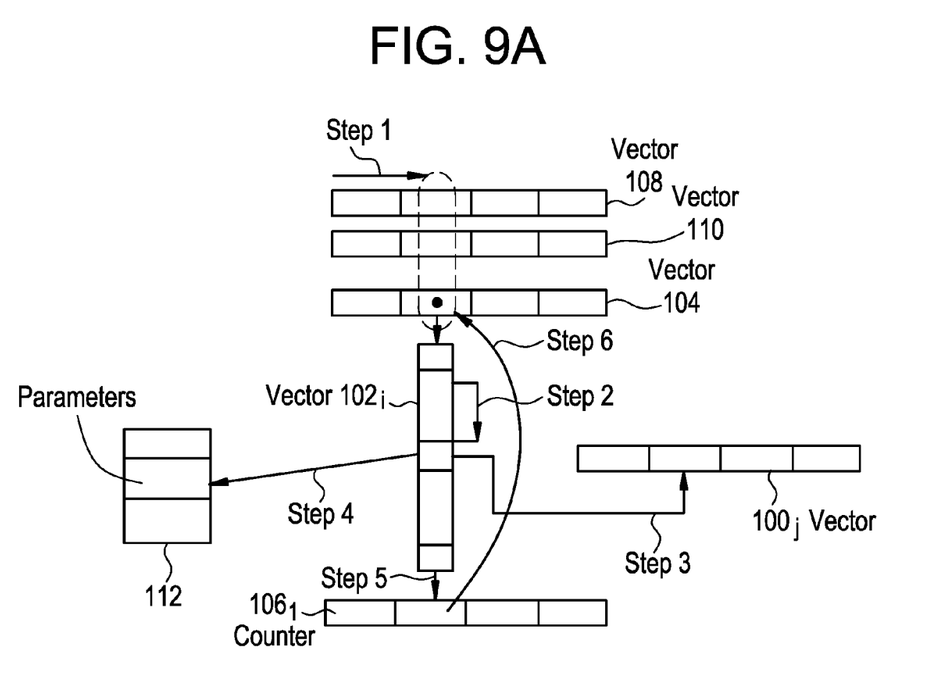
FIG. 9a shows, with the aid of vectors corresponding to those from FIG. 7, the steps of the method shown in FIG. 9.

The FIG. 9a diagram illustrates the various steps of the method just described with reference to FIG. 9, by means of the vectors 104, 108, 110, $102_j$ and $100_i$, the counters $106_1$, etc, and the parameters 112 (as described with reference to FIG. 7). Thus step 1 in FIG. 9a corresponds to steps 150, 152, 154 and 158 in FIG. 9, step 2 corresponds to step 160, step 3 corresponds to step 162, step 4 corresponds to step 164, step 5 corresponds to step 166, and step 6 corresponds to steps 168 and 170.

Figure 10:
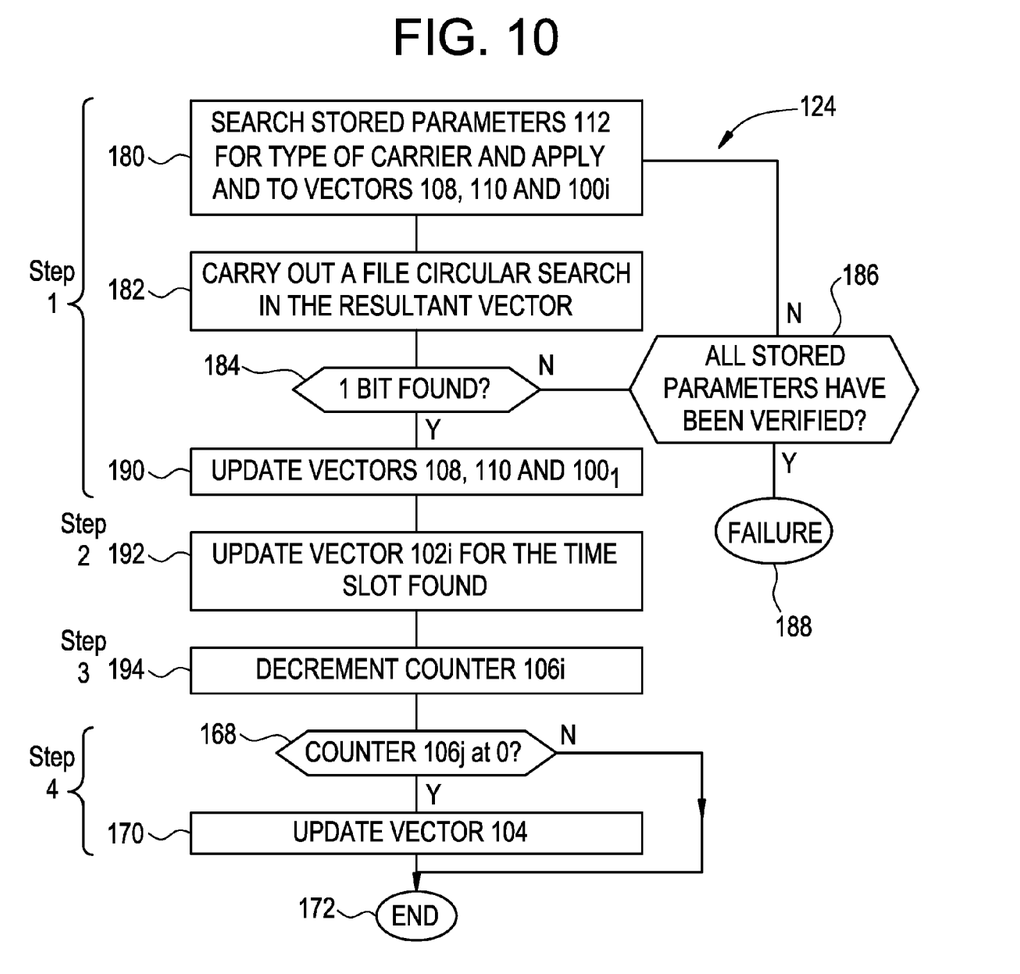
FIG. 10 is a flowchart showing another step of the method represented in FIG. 8.

Refer now to FIG. 10, which corresponds to step 124 of FIG. 8: attempt to use a stored parameter.

During the first step 180, the stored parameters 112 (FIG. 7) are searched for the type of carrier already stored and the binary AND operator is applied to the vectors 108, 110 and $100_i$ (frequency i). The parameter (frequency i) corresponds to one of the stored parameters 112.

The result of step 180 is a new vector which is searched for an available time slot. To this end a circular search is effected (step 182), starting from the last time interval found previously, i.e. the corresponding vector $100_i$ is searched from left to right, and if no available value is found the search returns to the start of the vector. Thus the allocation of resources can be smoothed in time, which, as already explained, means that the bit rate can be distributed in the transponder of the telecommunication satellite, the last time interval found being at a statistically random position.

The next step (step 184) verifies that a bit at 1 has been found in the corresponding vector. If not, the next step (step 186) verifies that all the stored parameters have been verified. In the latter case, the search fails (step 188). If not all of the parameters have been verified, the process returns to step 180.

If the result of the step 184 verification is that a bit at 1 has been found in the vector resulting from step 180, then step 190 is executed to update the vectors 108, 110 and $100_i$. The next step (step 192) updates the vector $102_i$ for the time slot that has been found. Then next step (step 194) decrements the counter $106_i$.

Finally, steps 168, 170 and 172 are identical to those described with reference to FIG. 9.

Figure 10A:
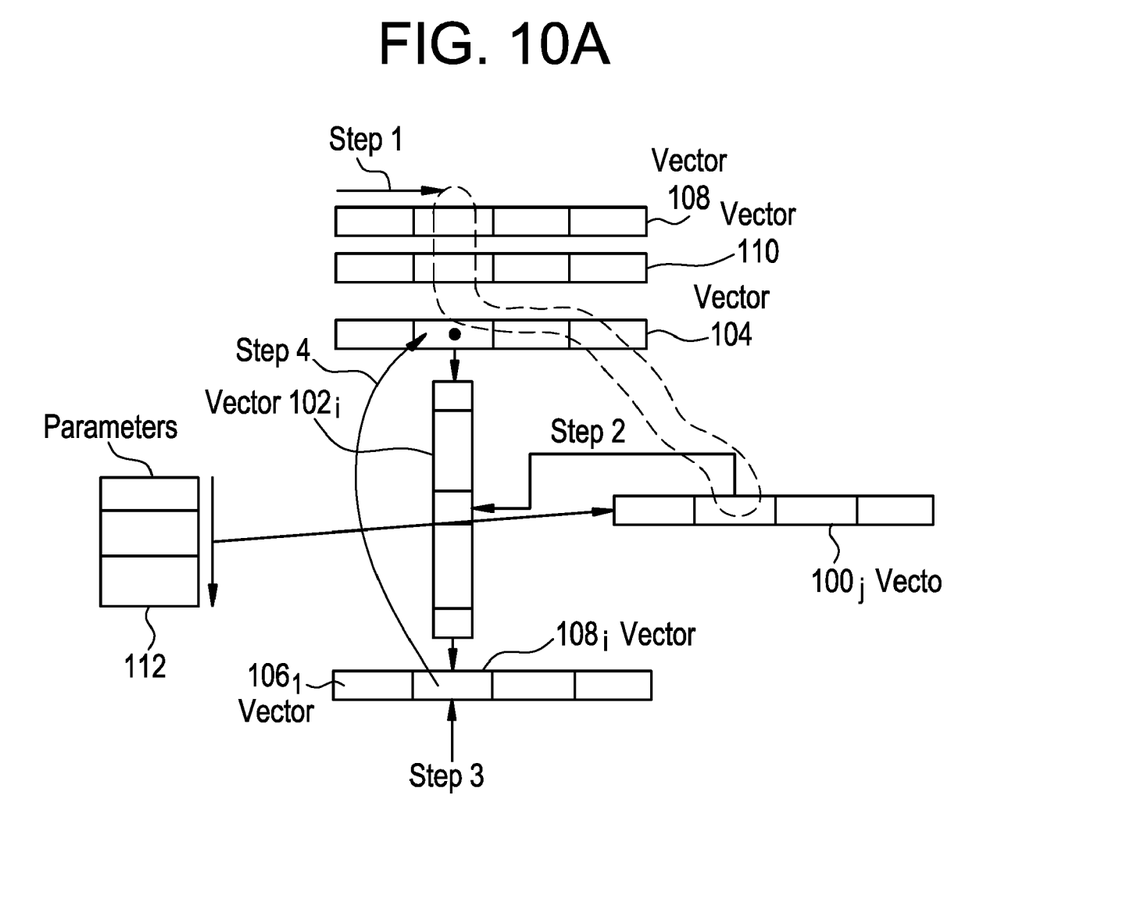
FIG. 10a shows, with the aid of vectors corresponding to those from FIG. 7, the steps of the method shown in FIG. 10.

FIG. 10a is a diagram similar to that of FIG. 9a and shows the various steps of the method that has just been described with reference to FIG. 10. Thus step 1, shown in dashed outline, corresponds to steps 180 to 190, step 2 corresponds to step 192, step 3 corresponds to step 194, and step 4 corresponds to steps 168 and 170.

A fast vector searching method that is used in particular in the first steps of the methods described with reference to FIGS. 9 and 10 is described next with reference to FIG. 11.

Consider, for example, a word or vector that comprises 1 024 bits=$2^{10}$ bits; the aim is to determine which bits have the value 1.

To this end, the set of 1 024 bits is divided into 32 words each of 32 bits, and a bit at 1 is allocated to each 32-bit word (secondary word) $SW_i$ indexed from 0 to 31 if at least one bit in that word has the value 1. The set of 32 bits obtained in this way constitutes a master word MW. Accordingly, if the $k^{th}$ bit is set in the master word MW, this means that there is necessarily at least one bit at 1 in the $k^{th}$ word SW. If all the bits of the $k^{th}$ word SW are at 0, then the $k^{th}$ bit of the word MW necessarily has the value 0.

Accordingly, to search for the 1 bits in the set of 1 024 bits, the master word MW is searched first. For the first $k^{th}$ bit at 1 found in the word MW, the secondary word $SW_k$ is then searched for the $i^{th}$ first bit that is at 1. The first bit at 1 in the sequence of 1 024 bits therefore has the index $S_{32k+i}$.

This type of search can be effected very quickly if the processor has a bus at least 32 bits wide and a machine code instruction for finding the first bit set in a 32-bit word in one processor cycle. If the processor does not have that instruction, performance is slightly degraded: the search is effected in the processor's level 1 cache. Overall, two processor cycles and two memory access cycles are therefore sufficient to find a bit at 1 in a series of 1 024 bits, one cycle to read the word MW and another cycle to read the word $SW_k$.

To write data in the vector with 1 024 bits, two memory access cycles are sufficient, with one cycle to write the master word MW and one cycle to write the word secondary word SW.

To erase data in this kind of vector or word with 1 024 bits, it is sufficient to set a bit of the master word MW to 0 when all of the bits of the corresponding secondary word are at 0.

Thus two memory access cycles at most are sufficient, regardless of the operation: reading, writing or erasing.

For circular searches of the type described above with reference to FIG. 10, the following procedure is adopted:

The starting position is an initial "start_offset" position from 0 to 1 023. This search consists in, starting from a 1 initially found in the overall word with 1 024 bits, attempting to search in a circular fashion for a bit different from that previously found, starting from the "start_offset" position, and up to position 1 023. If no bit at 1 is found, then the search starts again from 0 and goes as far as the start_offset position.

Figure 11:
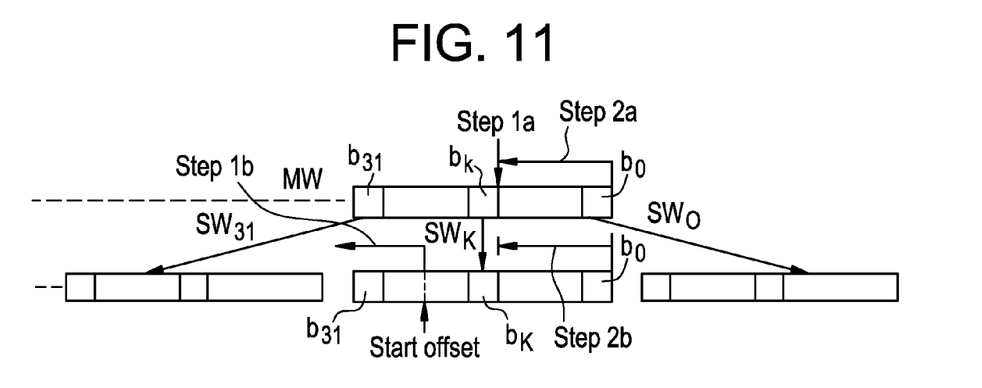
FIG. 11 is a diagram showing a fast method of searching a vector for a bit, this method being used in some steps of FIGS. 9 and 10.

Accordingly, in the master word MW, the search starts from the bit $b_k$ previously found (this is the search denoted 1a in FIG. 11). In this example this bit $b_k$ is at 1. In this case, the search continues in the secondary word $SW_k$ in which the bit previously found was the bit $b_i$. The search in the word MW starts from the bit whose number is equal to start_offset/32, with the bits with a lower number masked, and the search in the secondary word SW starts from the bit whose number is equal to start_offset modulo 32, with the bits with a lower number masked. Accordingly, the search in the secondary word $SW_k$ starts from this start_offset position modulo 32, and runs in the direction of increasing values, i.e. toward $b_{31}$. This search is represented by the arrow 1b. If a bit at 1 is found during this search, it is selected. On the other hand, if no bit at 1 is found during the search 1b, then the search returns to the master word MW and, starting from 0, a search 2a is effected. If no bit has the value 1 between $b_0$ and $b_k$ in the word MW, then the search fails again at the secondary word $SW_k$. In this case, the search starts again from $b_0$ (arrow 2b) and in the worse case scenario reverts to the bit $b_i$ previously found.

Accordingly, with the worst case scenario hypothesis envisaged here, it is necessary to effect four searches 1a, 1b, 2a and 2b, and thus four memory access cycles.

Figure 11A:
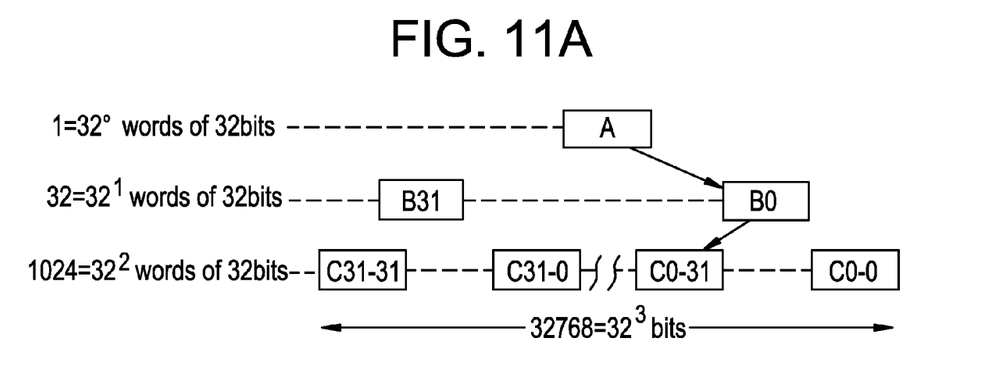
FIG. 11a is a diagram showing a fast method of searching a vector with $32^3$ bits.

The invention is naturally not limited to fast searching in words of 1 024 bits divided into 32 secondary words:

In the case of a word with $32^N$ positions, N memory access cycles are necessary to find a bit that is set, and thus 2N memory access cycles are required to find a bit that is set in a circular fashion among the $32^N$ positions by cascading words SW, as shown in FIG. 11a, which shows a word of $32^3$ bits.

In this figure, the 32 words C0-0 to C0-31 correspond to the word B0 and the 32 words C31-0 to C31-31 correspond to the word B31. The 32 words B0 to B31 correspond to the 32-bit master word A.

If the $i^{th}$ bit is set in the word A, then there is at least one $j^{th}$ bit set in the word B(i) and there is at least one bit set in the word C(32*ij).

These dispositions are obviously favorable to a very fast search, which is the required object in terms of resource allocation.

The foregoing description considers the worst case scenarios for a circular search in order to determine if the resource allocation algorithm is sufficiently fast. However, circular searches are not the only consumers of time. Generally speaking, the most unfavorable situation is that in which there remains only one available parameter, the other parameters being already in use or unusable. This situation corresponds to FIG. 8 in which n-1 (n being the number of parameters) steps 124 attempting to use a stored parameter have been executed and the branch 130 is executed once (attempt to obtain a new parameter). The maximum time to execute the search corresponds to the maximum number of memory access cycles to be executed.

In the worse case scenario, the maximum number of memory access cycles (Max_access) is:

Max_access=(MAX_PARAM−1)*Fast-Search+2*Fast-Search+(2*MAX_TRC_TYPE +3)*Write-BMP+1

The element MAX_TRC_TYPE signifies the maximum number of carrier types. "MAX_PARAM" signifies the maximum number of parameters and "Write_BMP" signifies writing in a bit vector.

In the above equation, the first term on the right-hand side corresponds to step 124 of FIG. 8, for which MAX_PARAM parameters are stored, but a null binary AND is effected.

The other terms correspond to step 130 of FIG. 8, in which the aim is to allocate a new parameter. To be more precise, the second term corresponds to steps 152 and 160 of FIG. 9, the third term corresponds to writing the vectors 104, 100 and 102 (three write operations) and the vectors 108 and 110 for all the carrier types concerned (here MAX_TRC-_TYPE), the factor 2 taking account of the source terminal and the destination terminal in the case of meshed allocation.

Accordingly, the update must be effected for all the carriers or all the carriers types to take account of the prohibition on use of two simultaneous time slots for sending or receiving. Finally, the last term (the number 1) corresponds to the updating of a counter $106_i$ (FIG. 7).

Thus the following equation is obtained:

$$2N(P-1)+4N+[(2T+3)N]+1=2NP-2N+4N+2NT+3N+1 \quad (F)$$

In this equation, N corresponds to the fact that vectors of length $32^N$ are used, P is the maximum number of parameters, and T is the maximum number of carrier types.

Assuming now that P=4, T=6 and N=2, i.e. $32^2$=1 024, applying equation (F) above yields 51 memory access cycles.

Further assuming that the total capacity of the MF-TDMA system is 90 Mbits per second, and that the bit rate of a time slot is 16 000 bits per second, 5 625 resources are available. A further hypothesis is that the number of terminals is 100 000.

With a 100 MHz memory access cycle, the memory access time is 10 ns, i.e. approximately 0.5 μs for 51 memory access cycles. However, this time of 0.5 μs must be weighted because it is necessary to take account, to a lesser extent, of the computation of the binary AND applied in the worst case scenario to three time slot vectors for a "meshed" allocation and, to a greater degree, of the fact that in each superframe it is necessary to duplicate the resources fixed for real time transmission given the size of the data to be duplicated and that, for each resource, a maximum of 2 μs is required. Accordingly, with 5 625 resources each of 2 μs, a maximum of 12 ms is required. In other words, of a total superframe budget of 100 ms, the resource allocation algorithm necessitates a budget of 12 ms. Note also that the time budget is a linear function of the number of resources. Also, the processing time depends to only a small degree on the number of terminals. This number is operative only when it is necessary to duplicate all the vectors, as indicated in the FIG. 5 flowchart, steps 64 to 68.

The methods described above are particularly suitable for the DVB-RCS standard for transmitting digital multimedia data via satellite.

There is claimed:

1. A method of allocating communication resources to terminals in a multiple frequency time division multiple access (MF-TDMA) telecommunication system, comprising:
   transmitting digital data in selected time slots on each carrier of a plurality of carriers, wherein said resources for each of said terminals are allocated by frames which are grouped into superframes and a pattern of resources, comprising time slots and carriers, allocated to one of said terminals for transmission of real-time data in each of said frames with a number in one of said superframes remains the same during the superframes of a call to which the real time data relates and the pattern of resources allocated to the real time data call is the same for all the frames of each of said superframes; and
   allocating said real-time data prior to allocation of non-real-time data wherein to facilitate a search for available resources to be allocated, for each type of carrier there is provided a set of vectors or words each consisting of a series of binary digits, one value of which represents an available resource and the other value of which represents unavailability of resources,
   wherein said set of vectors includes,
      a first vector having a number of components equal to the number of time slots of the frame and the value of each component of which represents the availability of one of a plurality of frequencies for the time slot concerned,
      a frequency vector for each time slot having a number of components equal to the number of said plurality of frequencies, the value of each component representing the availability of a corresponding one of said plurality of frequencies, and
      a time slot vector for each of said plurality of frequencies having a number of components equal to the number of time slots, the value of each component representing the availability of that time slot at that one of said plurality of frequencies.

2. The method claimed in claim 1 wherein said non-real-time data is allocated available resources between ones of said superframes.

3. The method claimed in claim 1 wherein, to allocate a resource, the first vector is searched first and then, if at least one component indicates the availability of one of the plurality of frequencies, the frequency vector is searched for the available one of said plurality of frequencies for the corresponding time slot.

4. The method claimed in claim 1 wherein, to allocate a resource to a terminal for which a carrier frequency of the type concerned is available, the time slot vector that corresponds to said available frequency is searched to determine an available time slot.

5. The method claimed in claim 1 wherein a vector comprising as many components as there are time slots and in which each component represents the availability of said time slot for sending and a vector comprising as many components as there are time slots and in which each component represents the availability of said time slot for receiving are provided for each carrier type.

6. The method claimed in claim 1 wherein, to enable fast searching, each vector or word is divided into a set of secondary words and a master word is formed having a number of binary digits equal to the number of secondary words, the value of each binary digit of the master word representing the presence, in the corresponding secondary word, of at least one binary digit representing the availability of a resource, the search being effected first in the master word and then in a secondary word corresponding to an available resource.

7. The method claimed in claim 6 wherein all the secondary words include the same number of binary digits and the master word includes a number of binary digits equal to the number of binary digits of each secondary word.

8. A method of allocating communication resources to terminals in a multiple frequency time division multiple access (MF-TDMA) telecommunication system, comprising:
   transmitting digital data in selected time slots on each carrier of a plurality of carriers, wherein said resources for each of said terminals are allocated by frames which are grouped into superframes and a pattern of resources, comprising time slots and carriers, allocated to one of said terminals for transmission of real-time data in each of said frames with a number in one of said superframes remains the same during the superframes of a call to which the real time data relates;
   when a time slot is allocated to a terminal for a type of sending or receiving, the simultaneous time slots of the other carriers which are equal to, which overlap, or which are contained within the allocated time slot are rendered unavailable for said terminal and for the same type of sending or receiving, so that said terminal cannot send or receive on two different carriers simultaneously in the same time slot; and
   allocating said real-time data prior to allocation of non-real-time data, wherein to facilitate a search for available resources to be allocated, for each type of carrier there is provided a set of vectors or words each consisting of a series of binary digits, one value of which represents an available resource and the other value of which represents unavailability of resources,
   wherein said set of vectors includes,
      a first vector having a number of components equal to the number of time slots of the frame and the value of each component of which represents the availability of one of a plurality of frequencies for the time slot concerned,
      a frequency vector for each time slot having a number of components equal to the number of frequencies, the value of each component representing the availability of a corresponding one of said plurality of frequencies, and
      a time slot vector for each of said plurality of vectors having a number of components equal to the number of time slots, the value of each component representing the availability of that time slot at that one of said plurality of frequencies.

9. The method claimed in claim 8 for allocating communication resources to terminals in a transparent satellite MF-TDMA telecommunication system wherein, to distribute said resources uniformly in time slots, the allocation of said resources to time slots in each frame is effected in each new superframe staffing from the last time slot that was set during the preceding superframe.

10. The method claimed in claim 8 wherein, to allocate a resource, the first vector is searched first and then, if at least one component indicates the availability of one of said plurality of frequencies, the frequency vector is searched for the available one of said frequencies for the corresponding time slot.

11. The method claimed in claim 8 wherein, to allocate a resource to a terminal for which a carrier frequency of the type concerned is available, the time slot vector that corresponds to said available frequency is searched to determine an available time slot.

12. The method claimed in claim 8 wherein a vector comprising as many components as there are time slots and in which each component represents the availability of said time slot for sending and a vector comprising as many components as there are time slots and in which each component represents the availability of said time slot for receiving are provided for each carrier type.

13. The method claimed in claim 8 wherein, to enable fast searching, each vector or word is divided into a set of secondary words and a master word is formed having a number of binary digits equal to the number of secondary words, the value of each binary digit of the master word representing the presence, in the corresponding secondary word, of at least one binary digit representing the availability of a resource, the search being effected first in the master word and then in a secondary word corresponding to an available resource.

14. The method claimed in claim 13 wherein all the secondary words include the same number of binary digits and the master word includes a number of binary digits equal to the number of binary digits of each secondary word.

* * * * *